United States Patent [19]

Berek et al.

[11] 4,255,286
[45] Mar. 10, 1981

[54] PROCESS OF PREPARING SPHERICAL MICROPARTICLES

[75] Inventors: Dusan Berek; Ivan Novak, both of Bratislava, Czechoslovakia

[73] Assignee: Urad Predsednictva Slovenskej Akademie, Bratislava, Czechoslovakia

[21] Appl. No.: 945,339

[22] Filed: Sep. 25, 1978

[30] Foreign Application Priority Data

Sep. 23, 1977 [CS] Czechoslovakia ............. 6164/77

[51] Int. Cl.³ .................. B01J 20/28; B01J 20/10; C01B 33/152; C01B 33/16
[52] U.S. Cl. ............................ 252/448; 252/316; 252/317; 252/426; 252/451; 264/5; 423/338; 428/402
[58] Field of Search ............... 252/448, 451, 316, 317; 423/338; 210/31 C; 264/117, 5, 6, 7

[56] References Cited

U.S. PATENT DOCUMENTS

| | | | |
|---|---|---|---|
| 3,489,516 | 1/1970 | Kummerle | 252/448 |
| 4,104,363 | 8/1978 | Vozka et al. | 252/448 |

Primary Examiner—P. E. Konopka
Attorney, Agent, or Firm—Burgess, Ryan and Wayne

[57] ABSTRACT

A process of preparing spherical microparticles having size of from 0.5 to 1000 μm and designed as chromatographic column charge, catalyst vehicle and absorption filling, or the like, by polymerizing a monomeric or polymeric substance in a macromolecular dispersing medium, the polymer forming said medium being different from that arising in polymerization process.

2 Claims, No Drawings

PROCESS OF PREPARING SPHERICAL MICROPARTICLES

The invention relates to a process of preparing exactly spherical microparticles from organic as well as inorganic materials, and particularly those of the polymer types, which particles having a size of from 0.5 to 1000 μm can be used, preferably, as a charge for chromatographic columns, as a catalyst vehicle, for absorption filling, or the like.

The hitherto used processes of preparing spherical polymer microparticles have been based upon the polymerization of a selected monomer dispersed in a low molecular weight material which is not miscible with said monomer.

For non-polar or weakly polar monomers as styrene, methylmethacrylate, or the like, water is most frequently used as the dispersing medium.

On the other hand, for polar monomers such as acrylamide-2-hydroxyethyl methacrylate, silicic acid or the like, there are used as dispersing media, non-polar organic solvents such as alkanes, carbon tetrachloride or the like. To achieve the desired dimensions of spherical particles and to prevent them from becoming sticky, the polymerization charges contain, as a rule, surface-active additives and the polymerization system has to be thoroughly agitated during the process. The construction of an appropriate polymerization reactor and often the removal of the surface-active agents from the product are expensive and time-consuming. Intense agitation is frequently the cause of deformations, especially in relatively large particles. The smaller are the particles to be prepared, the higher are the requirements for dispersing the monomer in the respective medium.

It is an object of the present invention to eliminate the problems of the prior art as hereinabove set forth and to provide an improved process of preparing polymeric spherical microparticles. According to the invention, a monomer or a solution of a monomer in a suitable solvent is dispersed in a macromolecular dispersing medium. The monomer or monomer solution can contain its own polymer or another polymer which latter, however, is not identical with that contained in the dispersing medium. As the macromolecular, i.e., polymeric dispersing media, it is possible to use preferably homopolymers such as, for instance, polyethers, polyesters, vinyl polymers, polysiloxanes, epoxides, polyolefines, polydianes, polyamides, polyurethanes, and the like, as well as corresponding bi- or multicomponent copolymers, terpolymers and polymer blends liquid under dispersing conditions, or solutions of macromolecular substances in suitable solvents.

The essential parameters of the appropriate macromolecular dispersing medium are viscosity, polarity and molecular weight. The viscosity of the macromolecular dispersing medium may vary between $1 \times 10^{-3}$ and $3 \times 10^1$ Pa.s and can be controlled by chemical composition, molecular weight of the polymer, temperature, and in cases wherein the medium is a polymer solution, also by the character of the solvent and the concentration of the polymer therein. The polarity of the macromolecular dispersing medium can be influenced by the chemical composition of the polymer, or of the solvent, and when oligomers are used, also by their molecular weight. The molecular weight of the polymer constituting the macromolecular dispersing medium, apart from the polymer viscosity and partially also polarity, influences also its compatibility with the monomer or monomer solution of which the microparticles are formed. The molecular weight of the macromolecular dispersing medium varies from several hundreds (polar oligomers) up to several hundreds thousands (non-polar polymers); in cases of using polymer solutions as dispersing media the molecular weight may reach several millions.

Depending upon the viscosity and polarity of the macromolecular dispersing medium and of the monomer, there can be obtained dispersions which are stable within the time period necessary for the polymerization process under given conditions. This time period may vary from seconds up to months. Advantageously, the polymerization process of the invention takes place under static or steady conditions which contribute to the formation of the perfectly spherical particle shape.

Apart from the polarity, viscosity and molecular weight of the polymer constituting the macromolecular dispersing medium, the size of the microspheres is influenced by the mode of the primary monomer dispersion, which means agitation intensity, or a spontaneous destruction, due to polymer incompatibility.

The following examples are given as illustrative only without, however, limiting the invention to the specific details thereof.

EXAMPLE 1

10 grams of recently distilled styrene were mixed with 100 grams of polydimethylsiloxane having an average molecular weight of $16 \times 10^3$. The thus produced clear solution was left at room temperature which was from 22° to 24° C. After seven days, the turbid system containing microspheres of 0.5 to 10 μm dia. was heated for 24 hours to 50° C. Once cooled, the system was diluted by 250 milliliters of gasoline, the microspheres were left to settle down, the liquid phase was decanted and the product was several times washed with gasoline and finally filtered. To reclaim polymethylsiloxane as well as gasoline, they were separated by simple distillation.

EXAMPLE 2

In 10 grams of distilled styrene 0.1 gram of polystyrene (average molecular weight of $2.5 \times 10^5$) was dissolved. The thus arisen solution was thoroughly shaken with 100 grams of polypropylene oil having an average molecular weight of $1 \times 10^3$. There was obtained a turbid system containing spherical microparticles of 1 to 50 μm size. The system was left to polymerize for 48 hours at 70° C. After cooling, the system was diluted with 250 milliliters of gasoline and the spheres were separated by the process referred to in EXAMPLE 1.

EXAMPLE 3

In 10 grams of distilled methylmethacrylate there was dissolved 0.1 gram of polystyrene having an average molecular weight of $2.5 \times 10^5$. To the solution, 26 milligrams of purified benzoyl peroxide were added, and after dissolution thereof, 10 milligrams of dimethylaniline. The thus prepared solution was immediately thoroughly shaken with 100 grams of polydimethylsiloxane having an average molecular weight of $16 \times 10^3$. There was obtained a turbid system containing exactly spherical particles of polymethacrylate having a size of from 1 to 50 μm. The polymerization was completed after one hour at 25° C. The microspheres were isolated from the system as above described in EXAMPLE 1.

EXAMPLE 4

5 grams of distilled styrene were mixed with 5 grams of purified divinylbenzene (commercial composition containing divinylbenzene, styrene and ethylbenzene). In this mixture, 0.1 gram of polystyrene (average molecular weight of $2.5 \times 10^5$) was dissolved. There were added 2 grams of dodecane and 25 milligrams of purified benzoyl peroxide, and the solution was intensely shaken with 100 grams of polydimethylsiloxane having an average molecular weight of $16 \times 10^3$. To the thus prepared turbid system containing spherical microparticles of 1 to 40 $\mu$m dia., 0.1 gram of dimethylaniline was added and shaken once more. After one hour, the polymerized particles were separated as described in EXAMPLE 1 and, finally, washed through with tetrahydrofuran.

EXAMPLE 5

One gram of acrylamide was dissolved in 10 grams of water. To the solution, 0.2% by weight of sodium peroxosulfate was added whereupon the solution wad shaken with 100 grams of propoxylated trimethylol propane having an average molecular weight of $5 \times 10^3$. There arose a dispersion of spherical microparticles which had a size of from one to 1000 $\mu$m. The polymerization was carried out at 60° C. for 2 hours. The microspheres were separated from the system as described in EXAMPLE 1.

EXAMPLE 6

In a mixture of 5 grams of purified styrene and 5 grams of purified divinylbenzene, one gram of polystyrene (average molecular weight of $2.5 \times 10^5$) was dissolved. 25 milligrams of purified dibenzoyl peroxide were dissolved in the solution. The resulting mixture was thoroughly shaken with 100 grams of a solution containing 10 grams of polymethylmethacrylate (average molecular weight of $6 \times 10^5$) and 0.1 gram of dimethylaniline in toluene. The resulting turbid system containing spherical microparticles having 2–100 $\mu$m dia. was diluted, after one hour's polymerization at 25° C., with 250 milliliters of toluene. The particles were left to settle down and then several times washed with toluene which was decanted off.

EXAMPLE 7

In 100 milliliters of a solution containing 40 volume parts of water glass (38° Be) and 60 parts of water, 50 milliliters of 4% sulphuric acid were poured. The thus prepared solution was immediately shaken with 1300 milliliters of polydimethylsiloxane (average molecular weight of $10^3$) and the thus prepared suspension was left to stay for one hour. The system was diluted with 2500 milliliters of gasoline. The resulting beads of silicic acid hydrogel were filtered, washed through at first with gasoline to remove the entire amount of polydimethylsiloxane, and then with water to remove soluble sodium salts, and, finally, dried. The size of the silica gel microparticles was one to 50 $\mu$m.

Spherical microparticles prepared in the process of the invention can be used as the charge for chromatographic columns, catalyst vehicles, absorption fillings, or the like.

Although the invention has been described in considerable detail, and particularly with reference to the above examples for the purpose of fully disclosing a practical operative process incorporating the invention, it is to be understood that the particular procedures described are intended to be illustrative only and that the various novel features of the invention may be incorporated in some other processes without departing from the spirit and scope of the invention as defined in the subjoined claims.

What is claimed is:

1. A process for preparing spherical microparticles of silica gel having a size varying from 0.5 to 1000 $\mu$m in diameter, comprising dispersing a water glass solution into macromolecular polydimethylsiloxane, subjecting said water glass to controlled polymerization under static conditions to form said spherical microparticles and recovering said silica gel spherical microparticles.

2. The process according to claim 1 wherein said polydimethylsiloxane has an average molecular weight of 1000.